United States Patent
Wang (10) Patent No.: US 12,307,205 B2
(45) Date of Patent: May 20, 2025

(54) ONE-CLICK FILMMAKING

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

(*) Notice: Subject to any disclaimer, the term of this patent is extended or adjusted under 35 U.S.C. 154(b) by 505 days.

(21) Appl. No.: 17/732,167

(22) Filed: Apr. 28, 2022

(65) Prior Publication Data

US 2023/0237268 A1    Jul. 27, 2023

Related U.S. Application Data

(60) Provisional application No. 63/302,686, filed on Jan. 25, 2022.

(51) Int. Cl.
| | | |
|---|---|---|
| *G06F 40/289* | (2020.01) | |
| *G06F 40/205* | (2020.01) | |
| *G10L 15/26* | (2006.01) | |
| *H04N 21/81* | (2011.01) | |
| *H04N 21/85* | (2011.01) | |

(52) U.S. Cl.
CPC .......... *G06F 40/289* (2020.01); *G06F 40/205* (2020.01); *G10L 15/26* (2013.01); *H04N 21/816* (2013.01); *H04N 21/85* (2013.01)

(58) Field of Classification Search
CPC ...... G06F 40/289; G06F 40/205; G06F 40/20; G06F 16/7844; G06F 16/783; G06F 16/7867; G06F 16/78; G10L 15/08; G10L 15/26; H04N 21/816; H04N 21/81; H04N 21/85; H04N 21/854; G11B 27/031
See application file for complete search history.

(56) References Cited

U.S. PATENT DOCUMENTS

| | | |
|---|---|---|
| 5,960,411 A | 9/1999 | Hartman et al. |
| 8,595,773 B1 | 11/2013 | Wang et al. |
| 8,831,902 B2 | 9/2014 | Wang |
| 8,856,845 B2 | 10/2014 | Wang |
| 8,869,211 B2 | 10/2014 | Wang |
| 8,964,127 B2 | 2/2015 | Wang |
| 9,100,701 B2 | 8/2015 | Wang |
| 9,866,913 B1 | 1/2018 | Wang |
| 10,860,649 B2 | 12/2020 | Wang |
| 11,120,638 B2 | 9/2021 | Sun et al. |

(Continued)

OTHER PUBLICATIONS

H. Wang, etc., "A New TV World for Kids—When ZUI Meets Deep Learning", in Proc. IEEE MIPR 2018.

*Primary Examiner* — Huyen X Vo
(74) *Attorney, Agent, or Firm* — ANOVA LAW GROUP, PLLC (57) ABSTRACT

A method and device for one-click filmmaking are provided. The method includes: obtaining a script from a user, detecting a single user operation, in response to the single user operation, obtaining a plurality of shots and estimating information of the plurality of shots based on the script, and automatically generating a film based on an auto-cinematography algorithm and the estimated information of the plurality of shots. The estimated information of one of the plurality of shots comprises at least one of a character of a shot, a scene of the shot, one or more positions of the character in the shot, a duration of the shot, or a shot type.

18 Claims, 5 Drawing Sheets

(56) References Cited

U.S. PATENT DOCUMENTS

| | | |
|---|---|---|
| 11,122,335 B2 | 9/2021 | Wang |
| 2011/0249953 A1* | 10/2011 | Suri .................... H04N 9/8205 386/239 |
| 2019/0215578 A1* | 7/2019 | Beckett ............. H04N 21/8126 |
| 2022/0101880 A1 | 3/2022 | Wang |
| 2022/0108417 A1* | 4/2022 | Liu ...................... G06T 1/0007 |

* cited by examiner

INT THRONE ROOM

... Fropp, Thouser, and Guard all standtrial in front of the PAPER PRINCESS, who looks down on them from her throne, disappointed...

THOUSER

*sighs*

PAPER PRINCESS

I just can't believe you three would do this!
Especially you, Guard ... I've always trusted you.

... Guard looks up at her with puppy dogeyes ...

PAPER PRINCESS

And frankly, I'm really disappointed in all of you.
You need to be punished for this. I hereby sentence
the three of you as guilty of aiding a fugitive.
25 years In the time out corner.

FIG. 3

Fropp     Thouser     Guard     Paper Princess

ONE-CLICK FILMMAKING

FIELD OF THE DISCLOSURE

The present disclosure relates to the field of computer graphics processing technologies and, more particularly, relates to a method and device for one-click filmmaking.

BACKGROUND

It has been always an intriguing research topic on how to make user experiences as simple and effective as possible. Amazon's invention of 1-click purchasing was a legend, which has been widely used in the past two decades. The frequency of user interaction and/or the clicks on the keys of the remote control was considered as a basic metric to evaluate the performance of a TV, based on an assumption that TV is leanback experience that needs as less user interaction as possible. An extremely simple experience called Binary TV is proposed that completely saves user from interacting with the complex remote controls, in which the user only need to make immediate binary (yes or no) decision when a query comes from TV. The user can make wishes (either explicitly or implicitly) during the TV watching process then the story will follow his/her wishes accordingly.

"Video playing while writing" experiences enabled a normal user to go through a unified process of story writing and filmmaking and generate a movie at the end. However, these earlier effort does not focus on the detailed steps and how the data can be automatically extracted to enable one-click filmmaking. The disclosed method and system are directed to solve one or more problems set forth above and other problems, which is useful for non-professionals or professionals who are not able to handle the whole filmmaking process by themselves.

BRIEF SUMMARY OF THE DISCLOSURE

One aspect of the present disclosure provides a method for one-click filmmaking. The method includes: obtaining a script from a user, detecting a single user operation, in response to the single user operation, obtaining a plurality of shots and estimating information of the plurality of shots based on the script, and automatically generating a film based on an auto-cinematography algorithm and the estimated information of the plurality of shots. The estimated information of one of the plurality of shots comprises at least one of a character of a shot, a scene of the shot, one or more positions of the character in the shot, a duration of the shot, or a shot type.

Another aspect of the present disclosure provides a device for one-click filmmaking, including a memory and a processor coupled to the memory. The processor is configured to perform a plurality of operations including: obtaining a script from a user, detecting a single user operation, in response to the single user operation, obtaining a plurality of shots and estimating information of the plurality of shots based on the script, and automatically generating a film based on an auto-cinematography algorithm and the estimated information of the plurality of shots. The estimated information of one of the plurality of shots comprises at least one of a character of a shot, a scene of the shot, one or more positions of the character in the shot, a duration of the shot, or a shot type.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and device for one-click filmmaking. The disclosed method and/or device can be applied in any proper occasions where film making is desired.

Figure 1:
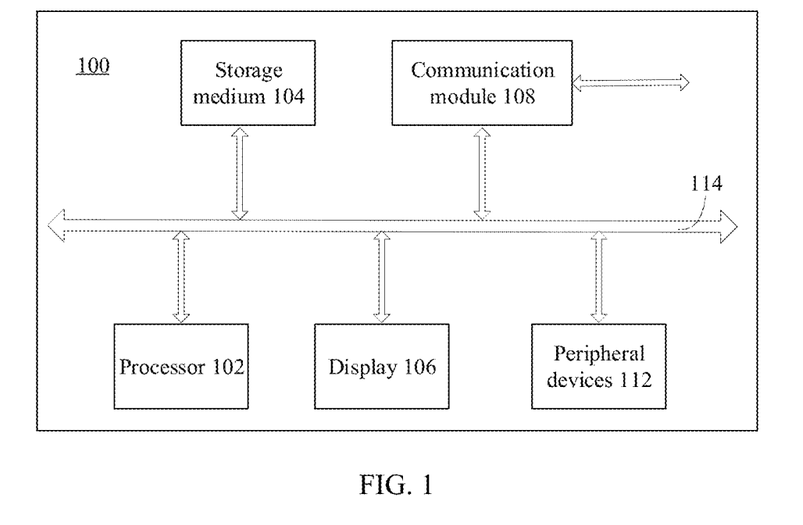
FIG. 1 is a block diagram of an exemplary computing system according to some embodiments of the present disclosure.

FIG. 1 is a block diagram of an exemplary computing system/device capable of implementing the disclosed one-click filmmaking method according to some embodiments of the present disclosure. As shown in FIG. 1, computing system 100 may include a processor 102 and a storage medium 104. According to certain embodiments, the computing system 100 may further include a display 106, a communication module 108, peripheral devices 112, and one or more bus 114 to couple the devices together. Certain devices may be omitted and other devices may be included.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as a one-click filmmaking program, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as text script, library data, training data set, and certain operations can be performed on the stored data, such as database searching and data retrieving.

The communication module 108 may include network devices for establishing connections through a network.

Display 106 may include any appropriate type of computer display device or electronic device display (e.g., CRT or LCD based devices, touch screens). The peripheral devices 112 may include additional I/O devices, such as a keyboard, a mouse, and so on.

In operation, the processor 102 may be configured to execute instructions stored on the storage medium 104 and perform various operations related to a one-click filmmaking method as detailed in the following descriptions.

It should be noted that the term "film" and "filmmaking" in the present disclosure may refer to any factors included in media content, for example, movie, tv show, music video, VR content, and any script-based media formats.

Figure 2:
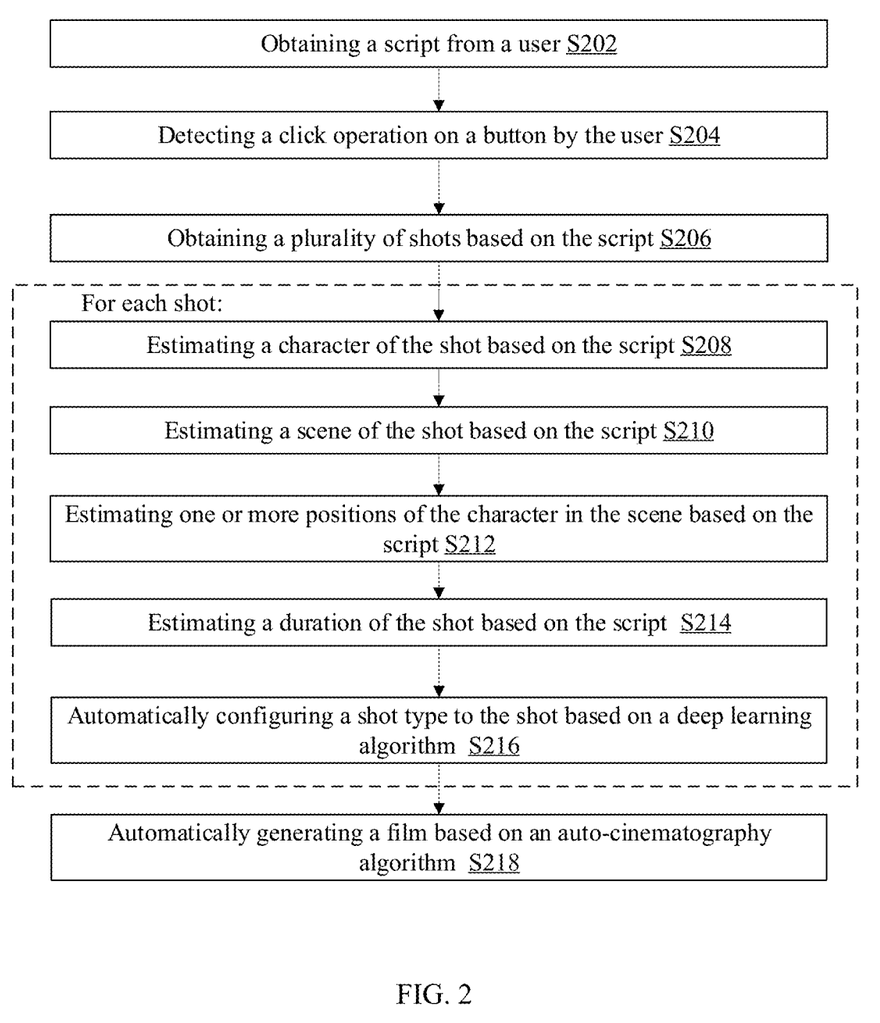
FIG. 2 illustrates an exemplary one-click filmmaking process 200 according to some embodiments of the present disclosure.

FIG. 2 illustrates an exemplary one-click filmmaking process 200 according to some embodiments of the present disclosure. The process 200 may be implemented by a one-click filmmaking device which can be any suitable computing device/server having one or more processors and one or more memories, such as computing system 100 (e.g., processor 102).

As shown in FIG. 2, the one-click filmmaking method consistent with embodiments of the present disclosure includes following processes.

At S202, a script is obtained from a user.

In some embodiments, the user uploads a screenplay, or writes a text script in the system, or uses any means to input some text into the system, for example, use voice input and the system convert the voice into text using automatically speech recognition (ASR). That is, obtaining the script from the user includes at least one of: receiving a screenplay uploaded by the user; receiving a text script input by the user; or receiving a voice input from the user and converting the voice input into text using ASR.

At S204, a single user operation is detected.

In some embodiments, the single user operation includes a click operation. In some embodiments, the user clicks on a button (or use other means to perform this single action) to start the 1-click filmmaking process.

At S206, in response to the single user operation, a plurality of shots are obtained and information of the plurality of shots are estimated based on the script. The estimated information of each shot includes at least one of a character of a shot, a scene of the shot, one or more positions of the character in the shot, a duration of the shot, or a shot type.

Figure 3:
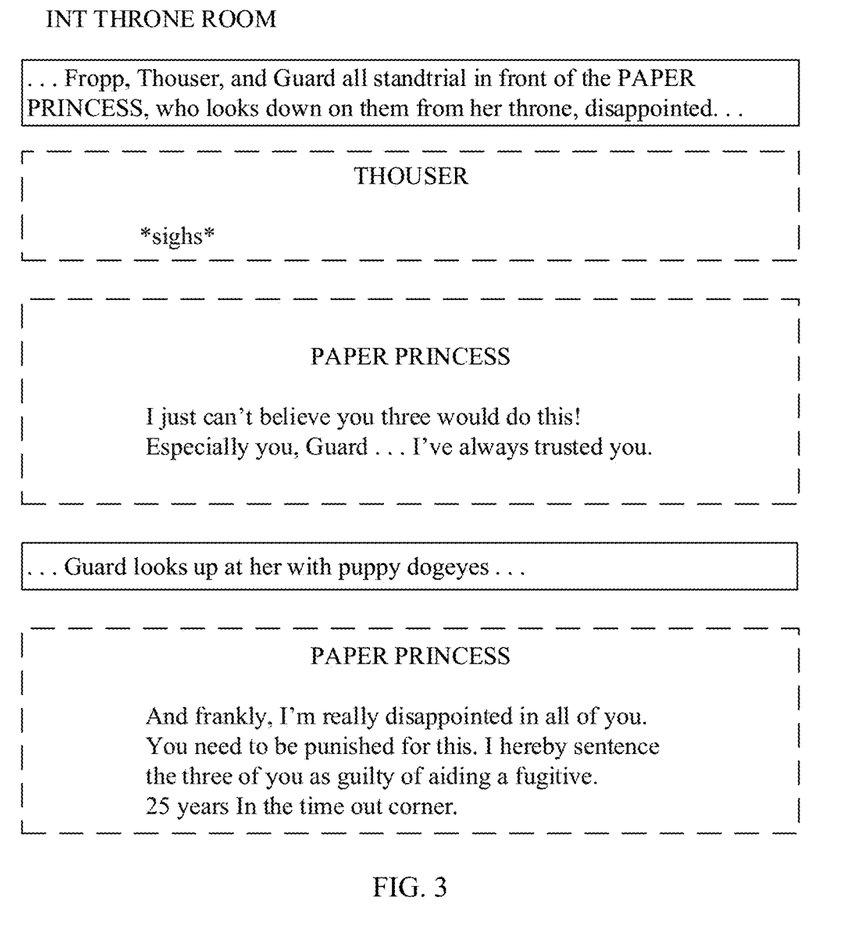
FIG. 3 illustrates an example script understanding.

In some embodiments, the script is analyzed with natural language processing (NLP) techniques: the script is separated into multiple shots, as shown in FIG. 3, and each shot contains subject and action that are corresponding to the original script. For example, the script is separated into paragraphs. Then each paragraph is split into sentences. Each sentence is further split into shots, where each shot has a subject and an action.

In some embodiments, estimating the information of the plurality of shots includes estimating the character of each shot based on the script and estimating the scene of each shot based on the script.

Figure 4:
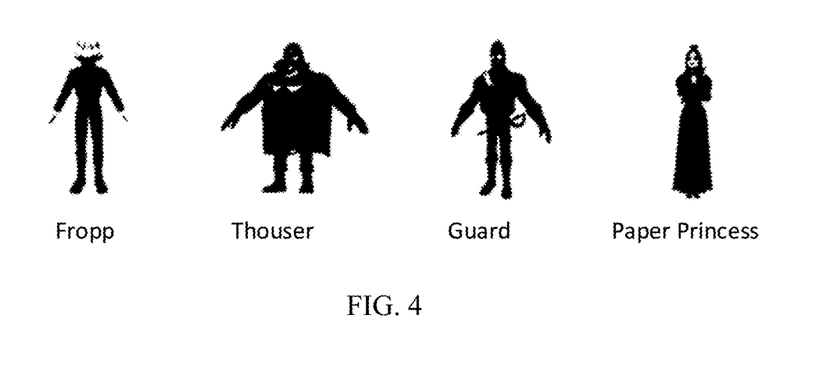
FIG. 4 illustrates an example of characters estimated.

In some embodiments, estimating the character of the shot based on the script includes finding, from a library, a candidate character matching a description of the character of the shot in the script. In some embodiments, based on the description of the character in the script, the system can find the best matching actor/actress in the library based on the matching of the tags associated with each candidate, as shown in FIG. 4.

Figure 5:
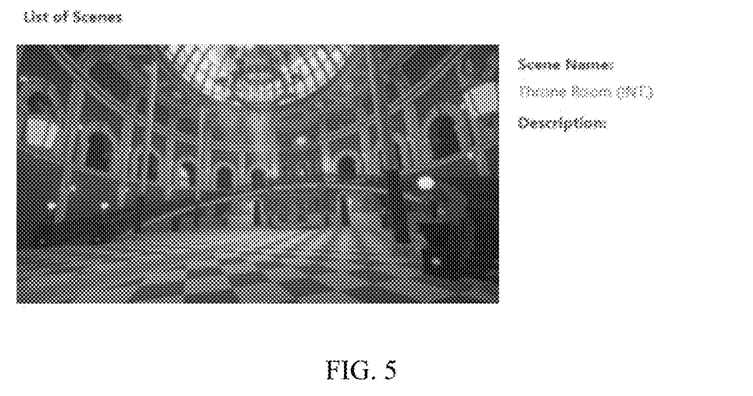
FIG. 5 illustrates an example of a scene estimated.

In some embodiments, estimating the scene of the shot based on the script includes finding, from the library, a candidate scene matching a description of the scene of the shot in the script. In some embodiments, based on the description of a scene in the script, the system can find the best matching scene in the library based on the matching of the tags associated with each candidate, as shown in FIG. 5.

Figure 6:
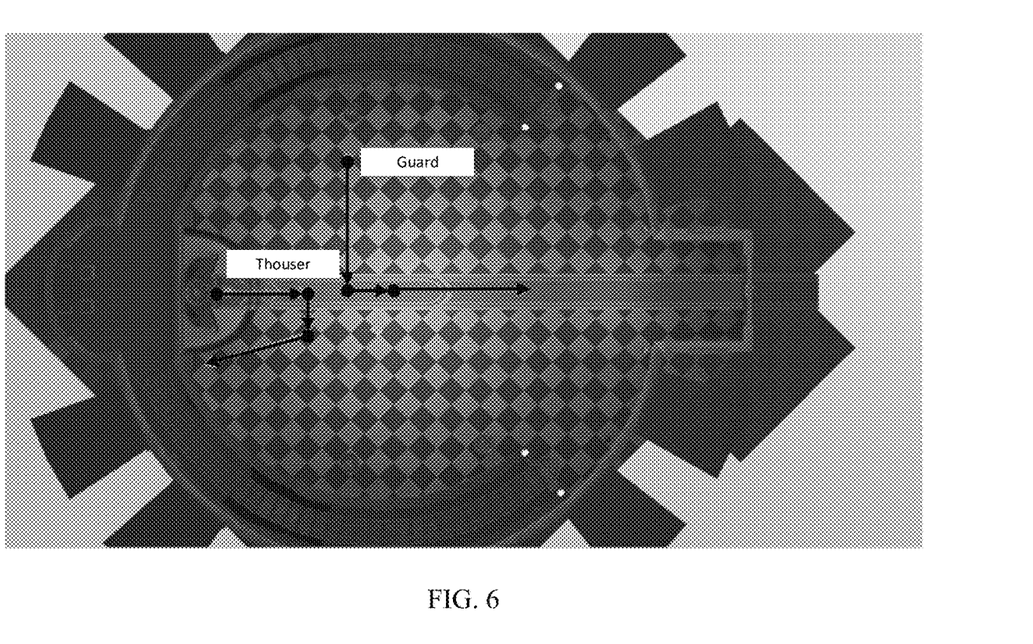
FIG. 6 illustrates an example of moving path of the characters.

In some embodiments, estimating the information of the plurality of shots includes estimating the one or more positions of the character in the scene based on the script. For each scene in the library, a number of landmarks (e.g., door, bathroom, hallway) have been specified in advance, thus the system can follow the description of the script to guess the possible positions of the character in the scene, as shown in FIG. 6. If the clue is not sufficient, the system will make the best guess for the positions.

In some embodiments, estimating the information of the plurality of shots includes estimating the duration of the shot based on the script.

In some embodiments, estimating the duration of the shot based on the script includes deriving the duration of the shot based on at least one of a length of a dialogue in the script, a distance of a movement of the character, or a time length of an action in the script. In some embodiments, the duration of a performance can be typically derived from the length of the dialogue or the distance of the movement, or the typically length of an action. When no clue can be found, the system will use a default value for this field.

In some embodiments, estimating the information of the plurality of shots includes automatically configured the shot type of each shot based on a deep learning algorithm.

The types of shots in a film, also known as shot sizes, refer to the elements making the film entertaining. For example, shot types may include a full shot, an extreme wide shot, a medium shot, and a close-up shot, etc.

In some embodiments, with deep learning algorithms, the system can train the existing shot type settings of past experiences and generate the best guess for the current camera shot type.

At S208, a film is automatically generated based on an auto-cinematography algorithm and the estimated information of the plurality of shots.

In some embodiments, automatically generating the film based on the auto-cinematography algorithm includes selecting a camera, and selecting a camera path. The film is automatically generated by generating camera sequences that follow cinematic rules based on the estimated information of the plurality of shots using the auto-cinematography algorithm.

In order to support the automatic film generation based on the information being extracted by the system and confirmed by the user, the system provides auto-cinematography algorithm that can automatically decide the camera selection and camera path at every frame. The generated film may include multiple video frames. Each video frame is generated by a virtual camera at a location in the scene and with a shooting angle. In some embodiments, the virtual camera for each frame of the video is determined based on the auto-cinematography algorithm. In some embodiments, an optimized algorithm that minimizes both fidelity error and aesthetic distortion may be used to select the camera path.

In some embodiments, the one-click filmmaking method consistent with embodiments of the present disclosure further includes obtaining personal information and preferences of the user.

In some embodiment, the system is required to manage the user's information and preferences so that such information is setup once but can be used unchanged many times in the future, just as the similar way of 1-click purchasing experiences.

In some embodiments, before the film is automatically generated, the one-click filmmaking method consistent with embodiments of the present disclosure further includes displaying the information estimated of each shot to the user, and receiving a user confirmation operation for the information estimated.

Figure 7:
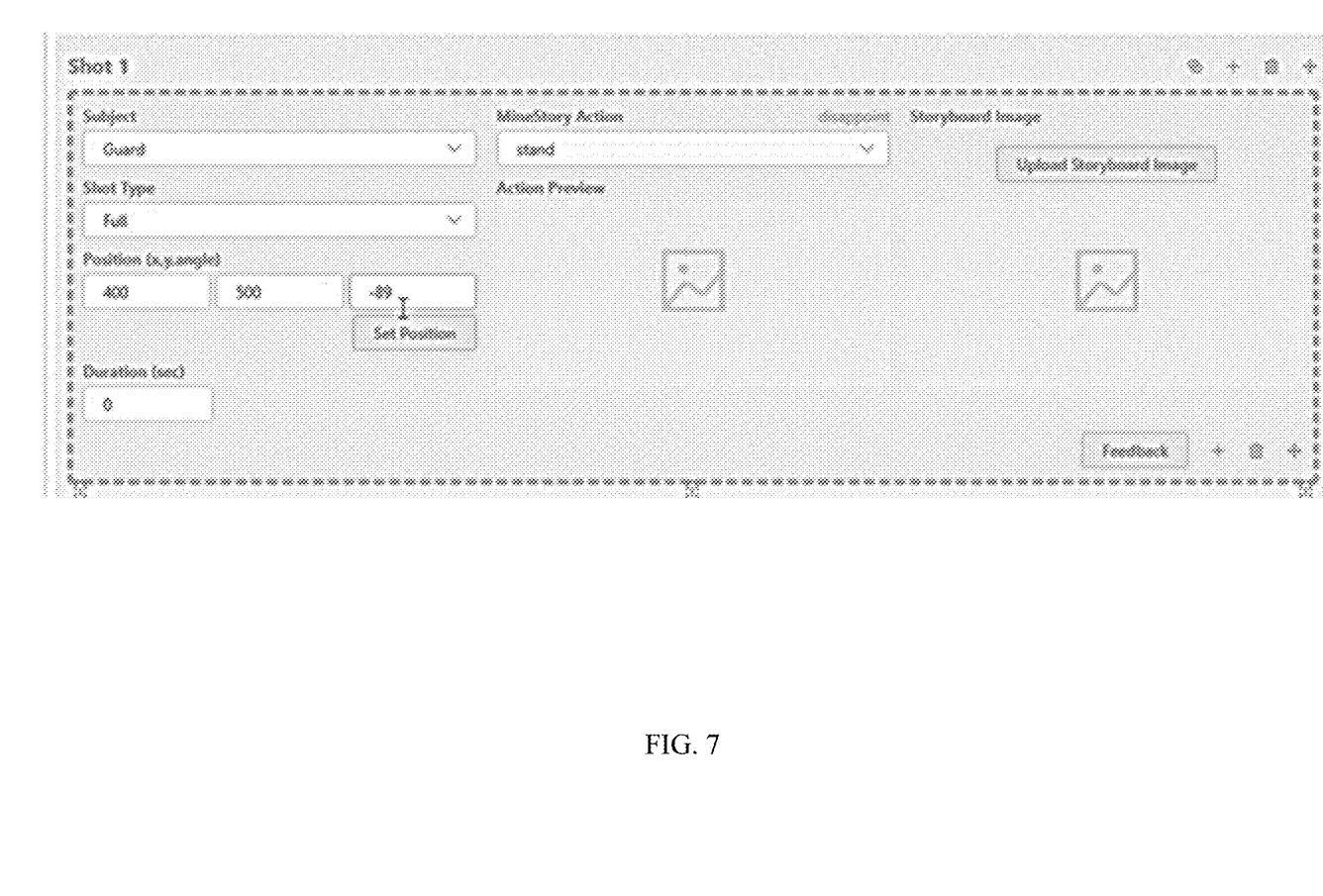
FIG. 7 illustrates an example window for displaying information estimated for the shot to the user.

In some embodiments, as shown in FIG. 7, the system popups a window for the user to confirm the following information which include but not limited to the follows:
  a. Character setting: the mapping between the characters in script and the available actor/actress (in the format of digital model) in the library;
  b. Scene setting: the mapping between the scene in script and the available 3D scene in the library;
  c. Shot segment: the script is split into a number of shots, and in each shot, the subject (i.e., a character) and his/her action (mapping between the action in script and the performance action model in library is completed), and the type of shot (e.g., Full, Medium, Close, etc.) are all specified. For speaking action, the dialogue of the subject is extracted from the script and get associated with the shot;
  d. Positions of characters in moving: the positions are interpreted from the script based on the context (e.g., "close to the door"), which sometimes may not be accurate due to lack of information;
  e. Duration of performance: the duration in time of an action, for example, the duration of a conversational sentence;
  f. User personal information that related to this transaction: this could involve the user's email address, the preferred approach to receive the generated film, the payment related information, etc.

In some embodiments, before the user confirmation operation for the information estimated is received, the one-click filmmaking method consistent with embodiments of the present disclosure further includes receiving a user adjustment operation for the information estimated.

In some embodiments, the user reviews the information shown in the window, edits or adjusts some of the settings until the user is satisfied. Then, the user confirms all the information are good to proceed.

In some embodiments, displaying the information estimated of each shot to the user and receiving the confirmation operation for the information by the user can be skipped if the user pre-sets "skip confirmation" in the system settings.

In some embodiments, for a dummy user who would like to trust the system's intelligence in all heart, the 3-step process (input text script, select 1-click-filmmaking, and then confirm/edit the information auto-generated from the script) can be even simplified to a 2-step process, that is: input script and select 1-click-filmmaking, as long as the user turns the "skip confirmation step" on in the system settings. That is, the system will not ask for confirmation/editing again in the future.

In some embodiments, after the film is automatically generated, the one-click filmmaking method consistent with embodiments of the present disclosure further includes requesting a user selection on whether to play the film generated, and in response to determining to play the film, playing the film to the user.

In some embodiments, after the film is automatically generated, the one-click filmmaking method consistent with embodiments of the present disclosure further includes requesting a user selection on whether the film generated is approved; in response to determining the film is not approved, displaying the information estimated of one of the plurality of shots to the user, receiving a user adjustment operation for the information estimated; and automatically generating an updated film based on the adjusted information and the auto-cinematography algorithm.

In some embodiments, displaying the information estimated of one of the plurality of shots to the user includes highlighting a part of the information estimated with a low confidence to the user. With the technology evolving and algorithm refinement, the confirmation/review/edit workload for the user is reduced significantly, for example, the system may be able to highlight the low-confidence part of the information extracted/generated for confirm, which speeds up the user's confirmation process, and make the 1-click filmmaking experience as simple as the current widely available 1-click purchasing experience.

The one-click filmmaking method consistent with embodiments of the present disclosure is useful for non-professionals or professionals who are not able to handle the whole filmmaking process by themselves. The user only needs to follow a 3-step process (which is exactly the same steps as indicated in Amazon's 1-click purchasing experiences): input text script, select 1-click-filmmaking, and confirm/edit the information auto-generated from the script, then a film in video format will be automatically generated for the user. This simple process indeed requires lots of technology support behind the scene, which include: script understanding, auto-staging, 3D rendering, machine learning, auto-cinematography, etc.

On the other hand, in the system, the user is also allowed (but not required) to make more iterations to refine the film by going back to the confirm/edit step to adjust detailed settings as much as they can.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for one-click filmmaking, applied to a computing device, comprising:
  obtaining a script from a user;
  detecting a single user operation;
  in response to the single user operation, obtaining a plurality of shots and estimating information of the plurality of shots based on the script, the estimated information of one of the plurality of shots comprising at least one of a character of a shot, a scene of the shot, one or more positions of the character in the shot, a duration of the shot, or a shot type, and estimating the information of the plurality of shots based on the script including:
    estimating the duration of one of the plurality of shots based on the script, including:
      deriving the duration of the one of the plurality of shots based on at least one of a length of a dialogue in the script, a distance of a movement of the character, or a time length of an action in the script; and
  automatically generating a film based on an auto-cinematography algorithm and the estimated information of the plurality of shots.

2. The method according to claim 1, wherein estimating the information of the plurality of shots further includes automatically configuring the shot type of one of the plurality of shots based on a deep learning algorithm.

3. The method according to claim 1, further comprising, before automatically generating the film:
displaying the information estimated of one of the plurality of shots to the user; and
receiving a user confirmation operation for the information estimated.

4. The method according to claim 3, further comprising, before receiving the user confirmation operation for the information estimated:
receiving a user adjustment operation for the information estimated.

5. The method according to claim 1, further comprising, after automatically generating the film:
requesting a user selection on whether to play the film generated; and
in response to determining to play the film, playing the film to the user.

6. The method according to claim 1, further comprising, after automatically generating the film:
requesting a user selection on whether the film generated is approved;
in response to determining the film is not approved, displaying information estimated of one of the plurality of shots to the user;
receiving a user adjustment operation for the information estimated; and
automatically generating an updated film based on the adjusted information and the auto-cinematography algorithm.

7. The method according to claim 1, wherein obtaining the script from the user includes at least one of:
receiving a screenplay uploaded by the user;
receiving a text script input by the user; or
receiving a voice input from the user and converting the voice input into text using automatically speech recognition (ASR).

8. The method according to claim 1, wherein the script is analyzed with natural language processing (NLP) techniques.

9. The method according to claim 1, wherein estimating the information of the plurality of shots further includes: for one of the plurality of shots,
estimating the character of the shot based on the script including finding, from a library, a candidate character matching a description of the character of the shot in the script; and
estimating the scene of the shot based on the script including finding, from the library, a candidate scene matching a description of the scene of the shot in the script.

10. A device for one-click filmmaking, comprising:
a memory; and
a processor coupled to the memory and configured to perform a plurality of operations comprising:
obtaining a script from a user;
detecting a single user operation;
in response to the single user operation, obtaining a plurality of shots and estimating information of the plurality of shots based on the script, the estimated information of one of the plurality of shots comprising at least one of a character of a shot, a scene of the shot, one or more positions of the character in the shot, a duration of the shot, or a shot type, and estimating the information of the plurality of shots based on the script including:
estimating the duration of one of the plurality of shots based on the script, including:
deriving the duration of the one of the plurality of shots based on at least one of a length of a dialogue in the script, a distance of a movement of the character, or a time length of an action in the script; and
automatically generating a film based on an auto-cinematography algorithm and the estimated information of the plurality of shots.

11. The device according to claim 10, wherein estimating the information of the plurality of shots further comprises:
automatically configuring the shot type of one of the plurality of shots based on a deep learning algorithm.

12. The device according to claim 10, wherein the plurality of operations performed by the processor further comprises, before automatically generating the film:
displaying the information estimated of one of the plurality of shots to the user; and
receiving a user confirmation operation for the information estimated.

13. The device according to claim 12, wherein the plurality of operations performed by the processor further comprises, before receiving the user confirmation operation for the information estimated:
receiving a user adjustment operation for the information estimated.

14. The device according to claim 10, wherein the plurality of operations performed by the processor further comprises, after automatically generating the film:
requesting a user selection on whether to play the film generated; and
in response to determining to play the film, playing the film to the user.

15. The device according to claim 10, wherein the plurality of operations performed by the processor further comprises, after automatically generating the film:
requesting a user selection on whether the film generated is approved;
in response to determining the film is not approved, displaying the information estimated of one of the plurality of shots to the user;
receiving a user adjustment operation for the information estimated; and
automatically generating an updated film based on the adjusted information and the auto-cinematography algorithm.

16. The device according to claim 10, wherein obtaining the script from the user includes at least one of:
receiving a screenplay uploaded by the user;
receiving a text script input by the user; or
receiving a voice input from the user and converting the voice input into text using automatically speech recognition (ASR).

17. The device according to claim 10, wherein the script is analyzed with natural language processing (NLP) techniques.

18. The device according to claim 10, wherein estimating the information of the plurality of shots further includes: for one of the plurality of shots,
estimating the character of the shot based on the script including finding, from a library, a candidate character matching a description of the character of the shot in the script; and estimating the scene of the shot based on the script including finding, from the library, a candidate scene matching a description of the scene of the shot in the script.

\* \* \* \* \*